United States Patent [19]

Orikasa et al.

[11] Patent Number: 4,717,759

[45] Date of Patent: Jan. 5, 1988

[54] ETHYLENE COPOLYMERS

[75] Inventors: Yuichi Orikasa; Shinji Kojima; Takashi Inoue, all of Yokohama; Kaoru Yamamoto; Atsushi Sato, both of Tokyo; Shigenobu Kawakami, Ichikawa, all of Japan

[73] Assignee: Nippon Petrochemicals Co., Ltd., Japan

[21] Appl. No.: 794,622

[22] Filed: Nov. 4, 1985

Related U.S. Application Data

[63] Continuation-in-part of Ser. No. 782,402, Oct. 1, 1985.

[30] Foreign Application Priority Data

| Oct. 3, 1984 [JP] | Japan | 59-207595 |
| Oct. 17, 1984 [JP] | Japan | 59-217924 |
| Nov. 6, 1984 [JP] | Japan | 59-233950 |

[51] Int. Cl.$^4$ .............................................. C08F 18/16
[52] U.S. Cl. .................................... 526/326; 526/329
[58] Field of Search ............ 526/329, 326, 293, 292.5

[56] References Cited

U.S. PATENT DOCUMENTS

| 3,210,326 | 10/1965 | Tousignant | 526/292.5 |
| 3,647,771 | 3/1972 | Nakaguchi et al. | 526/329 |
| 3,700,647 | 10/1972 | Nahagachi et al. | 526/329 |
| 3,741,947 | 6/1973 | Schrott | 526/293 |
| 3,887,610 | 3/1975 | Kober | 526/329 |
| 3,919,182 | 11/1975 | Gaylord | 526/329 |
| 3,976,631 | 8/1976 | van der Molen et al. | 526/329 |
| 4,121,032 | 10/1978 | Nakaguchi et al. | 526/329 |
| 4,211,730 | 7/1980 | Vollkommer | 526/292.5 |
| 4,349,651 | 9/1982 | Smith | 526/284 |

FOREIGN PATENT DOCUMENTS

| 0894702 | 4/1962 | United Kingdom | 526/329 |
| 0900969 | 7/1962 | United Kingdom | 526/329 |
| 1123723 | 8/1968 | United Kingdom | 526/329 |
| 1123722 | 8/1968 | United Kingdom | 526/329 |
| 1265173 | 3/1972 | United Kingdom | 526/329 |

Primary Examiner—Joseph L. Schofer
Assistant Examiner—J. M. Reddick
Attorney, Agent, or Firm—Ostrolenk, Faber, Gerb & Soffen

[57] ABSTRACT

The present invention provides an ethylene copolymer comprising 85.0 to 99.995 mol % of an ethylene unit, 0.005 to 5 mol % of a comonomer unit represented by the formula (I)

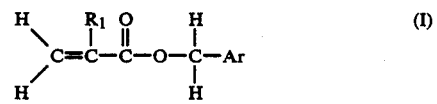

wherein Ar is

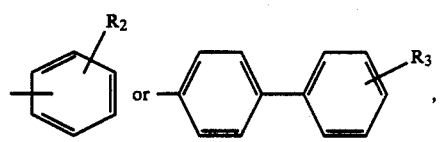

$R_1$ is a hydrogen atom or a methyl group, each of $R_2$ and $R_3$ is a hydrogen atom, a chlorine atom or a straight-chain or a side-chain alkyl group having 1 to 4 carbon atoms, and 0 to 10 mol % of an ethylenic unsaturated monomer unit, the ethylene copolymer having a density of 0.860 to 0.970 g/cm$^3$ and a melt index of 0.05 to 100 g/10 minutes.

5 Claims, 1 Drawing Figure

ETHYLENE COPOLYMERS

BACKGROUND OF THE INVENTION

This application is a continuation-in-part of application Ser. No. 782,402 filed Oct. 1, 1985.

FIELD OF THE INVENTION

The present invention relates to novel ethylene copolymers. More specifically, it relates to ethylene copolymers useful for electrical insulating materials, foamed materials, modification of polymers such as engineering plastics, and the like.

DESCRIPTION OF THE PRIOR ART

Olefin polymers, especially, ethylene polymers and propylene polymers have various excellent properties such as mechanical properties, workability and electrical properties, and are inexpensive and thus economical. Consequently, they are utilized as raw materials for electrical insulating materials and foamed materials, or as finished products such as films, pipes and containers in a variety of fields.

Further, there are well known olefin copolymers in which functional groups are introduced into the above-mentioned olefin polymers in order to improve their properties.

For example, polyethylene itself has small dielectric loss and has a high insulating power, and when cross-linked so as to remarkably improve its thermal resistance, it is employed as a good insulating material. However, for the purpose of utilizing polyethylenes as insulating materials for high-voltage cables and high-voltage equipments, a more improved and more hightened performance is desired for the polyethylenes.

Attempts have been made to improve the insulating power, and the method has been suggested in which an aromatic ring is introduced into an ethylene polymer.

For example, (1) A method in which an aromatic polymer such as a polystyrene is mixed with a polyethylene or an olefin polymer (Japanese Patent Publication No. 20717/1963, and Japanese Patent Provisional Publication Nos. 142651/1975 and 54187/1977).

(2) A method in which a polyethylene is mixed with a block copolymer of styrene and a conjugated diene (Japanese Patent Provisional Publication No. 41884/1975).

(3) A method in which a graft polymerization is carried out between a polyethylene and styrene (Japanese Patent Publication No. 18760/1979).

(4) A method in which a polyethylene is impregnated with an electrical insulating oil (Japanese Patent Provisional Publication No. 33938/1974).

However, even according to any method just described, a sufficient improvement of the insulating power cannot be accomplished. In addition thereto, as for the method of the paragraph (1) mentioned above, the miscibility of the polyethylene or the polyolefin and the styrene polymer is poor, and in the method of the paragraph (2) above, thermal resistance and extrusion workability are bad. In the case of the method described in the paragraph (3), the previously crosslinked polyethylene is graft-polymerized with styrene in order to improve destructive strength to impulse voltage in a high-temperature range of the polyethylene. As a consequence, intricate equipments and processes are required, and there exists a drawback in that the destructive strength to the impulse voltage in the low-temperature range is poorer than that of an untreated raw polyethylene. With regard to the method of the paragraph (4), the kneaded electrical insulating oil will be bled out when the polyethylene is used for a long period of time, or when environments are changed, so that functional effects of the polyethylene will be poorer than by any other method. Accordingly, the methods are unsatisfactory, and thus insulating materials are now demanded which are stable for a long period of time and which have better performance.

On the other hand, speaking of the field of foamed materials, the foamed polyethylene materials advantageously have a high elasticity and good strain recovery properties against repeated stress, but foam molding in a mold only permits manufacturing products having simple shapes. Further, in the case of bead foam molding (which is a molding method of using preliminarily foamed grains and carrying out the foam molding with the aid of steam heating) which enables the foamed materials having complicated shapes to be prepared, the diffusion of a gas at the foaming step is too prompt and thus the decision of molding conditions is difficult, for which reason, the bead foam molding is not utilized prevalently.

It can also be presumed that a polystyrene suitable for the bead foam molding be blended with polyethylene grains which have been preliminarily foamed by adding a foaming agent thereto before the foam molding in a mold, but in such a molding method, the fusing adhesion between the different kinds of beads is bad, and thus practicable foamed articles cannot be manufactured.

In recent years, some methods for preparing foamed polyethylene beads have been suggested by which the above-mentioned drawbacks can be eliminated, the release of a used foaming agent can be prevented, and foamed materials having a high magnifying power can be prepared.

For example, (1) A method comprising the steps of dispersing polyethylene grains, a styrene monomer and a polymerization catalyst into an aqueous medium, forcedly adding thereto a gaseous or liquid physical foaming agent in ordinary state, and carrying out a suspension polymerization of the styrene monomer under heating and pressurizing in order to prepare foamed and modified polyethylene grains (Japanese Patent Publication Nos. 2469/1969, 32622/1970 and 32623/1970).

(2) A method comprising the steps of dispersing polyethylene grains, a styrene monomer and a polymerization catalyst into an aqueous medium, carrying out suspension polymerization under heating and pressurizing in order to prepare styrene-modified polyethylene grains, and adding a physical foaming agent to the prepared grains (Japanese Patent Publication Nos. 10150/1977 and Japanese Patent Provisional Publication Nos. 85187/1974 and 97884/1974).

(3) A method comprising the steps of carrying out a graft polymerization of a polyolefin resin with styrene under the irradiation of ionized radiation, and adding thereto a foaming agent in order to prepare a porous material (Japanese Patent Publication No. 19382/1969).

In addition to these mentioned methods, many techniques have been suggested, but all of them require complicated processes and equipments.

As a modifier for the preparation of a mixed composition of a resin such as a polyphenylene ether or a polycarbonate, i.e., a resin called an engineering plastic and an olefin resin, or as a modifier for improving impact resistance and workability of the engineering plastic, a styrene graft polyolefin or a styrene polymer is often used (Japanese Patent Provisional Publication Nos. 7448/1983, 98359/1983 and 141240/1983), but miscibility between the engineering plastic and the olefin polymer is essentially poor, which fact is still present as a great problem. Therefore, the solution of this problem is strongly desired of late.

SUMMARY OF THE INVENTION

In view of the above-mentioned situation, the present invention has now been achieved as a result of intensive research, and its object is to provide novel ethylene copolymers capable of effectively improving performances necessary for electrical insulating materials, foamed materials and polymers, without involving conventional problems.

DETAILED DESCRIPTION OF THE INVENTION

Figure 1:
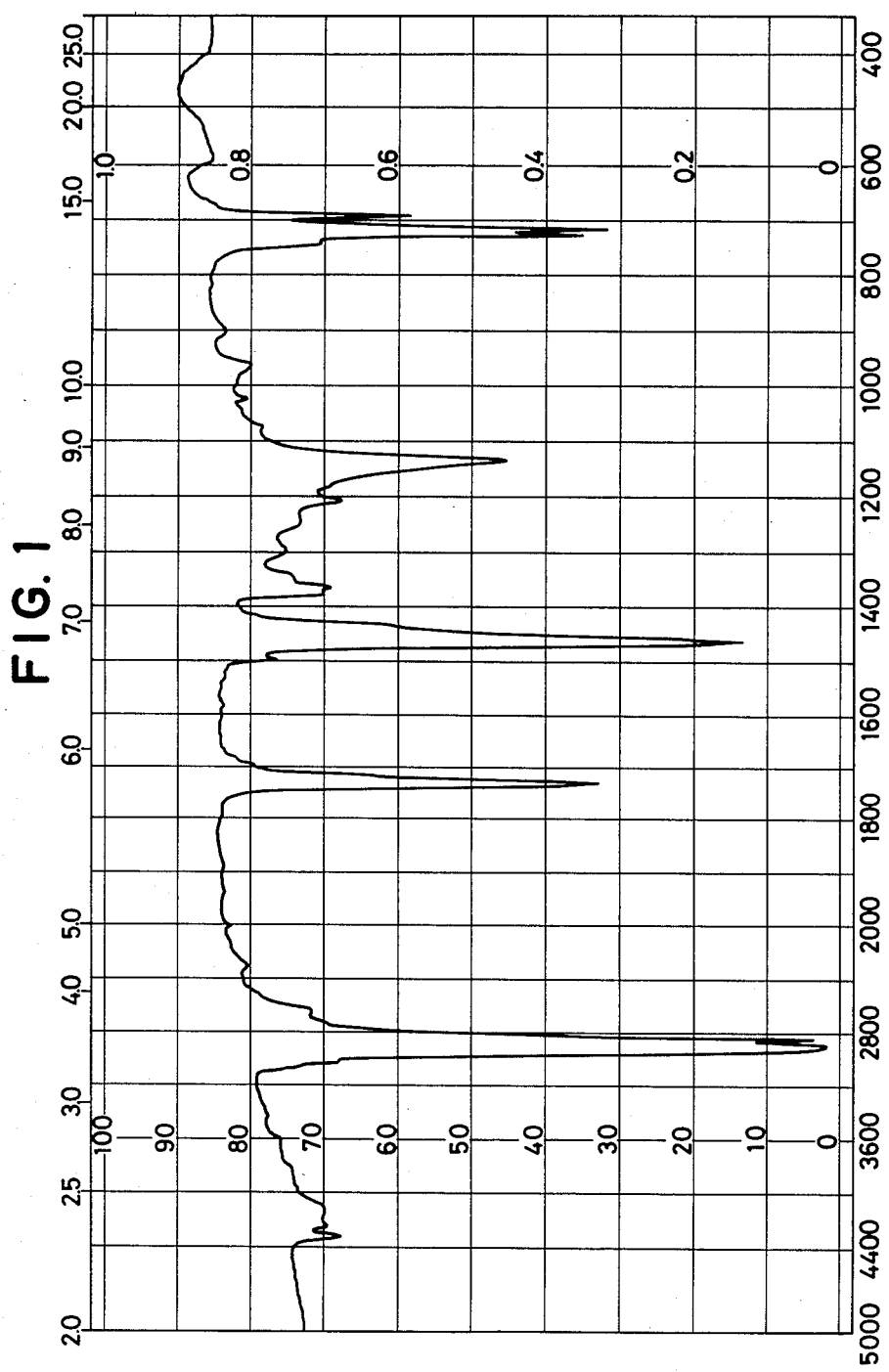
FIG. 1 is an infrared spectrum chart of a copolymer which has been prepared in Example 3 regarding the present invention.

The present invention is directed to a novel ethylene copolymer comprising 85.0 to 99.995 mol% of an ethylene unit, 0.005 to 5 mol% of a comonomer unit represented by the formula (I)

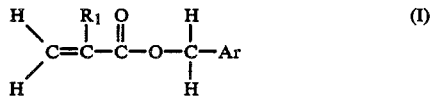

wherein Ar is

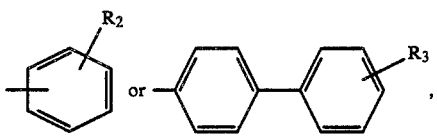

$R_1$ is a hydrogen atom or a methyl group, each of $R_2$ and $R_3$ is a hydrogen atom, a chlorine atom or a straight-chain or a side-chain alkyl group having 1 to 4 carbon atoms, and 0 to 10 mol% of an ethylenic unsaturated monomer unit, the ethylene copolymer having a density of 0.860 to 0.970 g/cm$^3$ and a melt index of 0.05 to 100 g/10 minutes.

The comonomer represented by the formula (I) is at least one selected from the group consisting of benzyl methacrylate, methylbenzyl methacrylate, chlorobenzyl methacrylate, benzyl acrylate, methylbenzyl acrylate, chlorobenzyl acrylate, phenylbenzyl methacrylate and phenylbenzyl acrylate, and above all, benzyl methacrylate and benzyl acrylate are preferred.

A content of the above-mentioned comonomer in the copolymer is within the range of 0.005 to 5 mol%, preferably 0.01 to 2 mol% in terms of the comonomer unit.

When the content of the comonomer is less than 0.005 mol%, modification effects of the ethylene copolymer will scarcely be perceived; when it is in excess of 5 mol%, the copolymer will be economically expensive.

The ethylenic unsaturated monomer used in the present invention is at least one selected from the group consisting of olefins having 3 to 10 carbon atoms such as propylene, butene-1, hexene-1, 4-methylpentene-1, octene-1 and decene-1; styrene; vinyl esters of alkane carboxylic acids having 2 and 3 carbon atoms; acrylic and methacrylic esters such as methyl acrylate, methyl methacrylate, ethyl acrylate, ethyl methacrylate, propyl acrylate, propyl methacrylate, glycidyl acrylate and glycidyl methacrylate; ethylenic unsaturated carboxylic acids and their anhydrides such as acrylic acid, methacrylic acid, maleic acid, fumaric acid and maleic anhydride; and ethylenic unsaturated carboxylic acid amides such as acrylic acid amide, methacrylic acid amide, maleic acid amide and fumaric acid amide.

The content of the above ethylenic unsaturated monomer used in the present invention is within the range of 0 to 10 mol%, preferably 0 to 7 mol%, more preferably 0 to 5 mol%.

The ethylene copolymer of the present invention can be manufactured by known methods such as an ionic polymerization employing a Ziegler catalyst and a radical polymerization under a high pressure, but in the case that the copolymer for electrical insulating materials is manufactured, the radical polymerization is preferable because there is less catalyst residue.

The Ziegler catalyst used in the ionic polymerization is a solid catalyst containing magnesium and titanium, and such a catalyst can be prepared by causing a titanium compound to be carried on an inorganic solid compound containing magnesium in a known manner and then combining it with an organic aluminum compound. Examples of the aforesaid inorganic solid compounds include metallic magnesium, magnesium hydroxide, magnesium carbonate, magnesium oxide and magnesium chloride; double salts, double oxides, carbonates, chlorides and hydroxides each containing a magnesium atom and a metal selected from silicon, aluminum and calcium; and compounds obtained by treating or reacting these inorganic solid compounds with oxygen-containing compounds, sulfur-containing compounds, aromatic hydrocarbons and halogen-containing compounds. The above-mentioned ionic polymerization can be carried out in the presence of such a Ziegler catalyst as mentioned, like a usual olefin polymerization.

This polymerization reaction is accomplished in an essentially oxygen-free and water-free state in a gaseous phase in the presence of an inactive solvent, and if necessary, by utilizing the monomer itself as a solvent. With regard to polymerization conditions for the olefin, a temperature is from 20° to 300° C., preferably 40° to 200° C., and a pressure is from ordinary pressure to 70 kg/cm$^2$.g, preferably 2 to 60 kg/cm$^2$.g. The adjustment of a molecular weight can be carried out to some extent by changing polymerization conditions such as the polymerization temperature and molar ratio of used catalyst but can be effectively accomplished by adding hydrogen to the polymerization system. Further, there can be carried out, without any problem, a multi-stage polymerization reaction comprising two or more stages in which polymerization conditions such as hydrogen concentrations and polymerization temperatures are different.

On the other hand, the above-mentioned radical polymerization under a high pressure means a method of catalytically polymerizing the monomers at once or stepwise under conditions of a polymerization pressure of 500 to 4,000 kg/cm², preferably 1,000 to 3,500 kg/cm² and a reaction temperature of 50° to 400° C., preferably 100° to 350° C. in the presence of a free-radical catalyst, a chain transfer agent, and if necessary, an auxiliary in an autoclave or a tube type reactor.

Examples of the above-mentioned free-radical catalysts include usual initiators such as peroxides, hydroperoxides, azo compounds, amine oxides and oxygen.

Further, examples of the chain transfer agents include hydrogen, propylene, butene-1; saturated aliphatic hydrocarbons and halogen-substituted hydrocarbons having 1 to 20 carbon atoms or more such as methane, ethane, propane, butane, isobutane, n-hexane, n-heptane, cycloparaffins, chloroform and carbon tetrachloride; saturated aliphatic alcohols having 1 to 20 carbon atoms or more such as methanol, ethanol, propanol and isopropanol; saturated aliphatic carbonyl compounds such as carbon dioxide, acetone and methyl ethyl ketone; and aromatic compounds such as toluene, diethylbenzene and xylene.

In the ethylene copolymer for electrical insulating materials manufactured by the high-pressure radical polymerization method, there occurs less tree phenomenon than by the ionic polymerization, the tree phenomenon being caused by foreign matter contamination such as catalyst residues. Therefore, the thus prepared copolymer can have remarkably improved insulating power.

The ethylene copolymer of the present invention also is excellent as a foamed material and also as a modifier for a polymer, but so long as the properties of the ethylene copolymer are not impaired remarkably, the copolymer may be mixed, for various uses, with at least one of thermoplastic resins such as olefin polymers (inclusive of copolymers) other than the ethylene copolymers of the present invention, polyacrylonitriles, polyamides, polycarbonates, ABS resins, polystyrenes, polyphenylene oxides, polyvinyl alcohol resins, vinyl chloride resins, vinylidene chloride resins and polyester resins; thermosetting resins such as petroleum resins, coumarone-indene resins, phenolic resins and melamine resins; and synthetic and natural rubbers such as ethylene-propylene copolymer rubbers (EPR, EPDM and the like), SBR, NBR, butadiene rubbers, IIR, chloroprene rubbers, isoprene rubbers and styrene-butadiene-styrene block copolymers.

In the present invention, there may be used, without any problem, an organic or an inorganic filler, an antioxidant, a lubricant, an organic or an inorganic pigment, an ultraviolet screening agent, an antistatic agent, a dispersant, a copper de-activator, a neutralizer, a foaming agent, a plasticizer, an anti-foaming agent, a flame-retardant, a crosslinking agent, an improver for flow, an improver for weld strength and a nucleating agent.

EXAMPLES 1 TO 10

In each example set forth in Table 1, the atmosphere in a 3.8-liter metallic autoclave reactor equipped with a stirrer was sufficiently replaced with nitrogen, and a predetermined amount of ethylene, n-hexane, which was a chain transfer agent, and each comonomer were then placed in the reactor. Afterward, di-tertiary-butyl peroxide which was a polymerization initiator was poured thereinto, and polymerization was carried out at a temperature of 170° C. under a pressure of 1,600 kg/cm² for one hour.

A portion of the resultant polymer was dissolved in heated carbon tetrachloride and then was added to a large amount of acetone in order to deposit it again, and washing was carried out with acetone, followed by vacuum drying.

Each purified and dried polymer was molded into a sheet having a thickness of 10 to 20 μm by means of heating compression. The ethylene copolymer of the present invention was confirmed from absorbencies mainly based on an ester bond in the vicinity of 1,730 cm$^{-1}$ and a benzene ring around 700 cm$^{-1}$ in accordance with an infrared spectroscopic analysis. The content of each copolymerized comonomer in the polymer was quantitatively analyzed on the basis of an absorbency due to an ester bond in the vicinity of 1,730 cm$^{-1}$, and the results are shown in Table 1. Further, the melt index and the density of each produced polymer were measured in accordance with JIS K 6760.

TABLE 1

| | Polymerization conditions | | | | |
|---|---|---|---|---|---|
| | Material monomers | | | | Ditertiary |
| | Ethylene | Comonomer | | n-Hexane | butyl peroxide |
| Example | (g) | Name | (g) | (g) | (mg) |
| 1 | 1,750 | Benzyl methacrylate | 3 | 280 | 12.3 |
| 2 | 1,780 | Benzyl methacrylate | 10 | 280 | 16.4 |
| 3 | 1,730 | Benzyl methacrylate | 30 | 270 | 12.3 |
| 4 | 1,710 | Benzyl methacrylate | 50 | 210 | 16.4 |
| 5 | 1,740 | Benzyl methacrylate | 100 | 150 | 16.4 |
| 6 | 1,740 | Benzyl acrylate | 20 | 270 | 12.3 |
| 7 | 1,750 | Methylbenzyl methacrylate | 10 | 270 | 12.3 |
| 8 | 1,750 | Chlorobenzyl methacrylate | 10 | 270 | 12.3 |
| 9 | 1,740 | Phenylbenzyl acrylate | 10 | 280 | 16.4 |
| 10 | 1,740 | Phenylbenzyl methacrylate | 10 | 280 | 16.4 |

| | Produced polymer | | | |
|---|---|---|---|---|
| Example | Yield (g) | Melt index (g/10 min) | Density (g/cm³) | Content of comonomer (mol %) |
| 1 | 318 | 1.3 | 0.928 | 0.09 |
| 2 | 341 | 2.0 | 0.929 | 0.25 |
| 3 | 258 | 2.9 | 0.931 | 1.1 |
| 4 | 273 | 2.4 | 0.933 | 1.7 |
| 5 | 270 | 4.1 | 0.939 | 3.9 |
| 6 | 282 | 1.9 | 0.930 | 0.71 |
| 7 | 228 | 5.2 | 0.930 | 0.28 |
| 8 | 253 | 3.6 | 0.930 | 0.24 |
| 9 | 296 | 3.1 | 0.929 | 0.13 |
| 10 | 305 | 2.7 | 0.929 | 0.16 |

What is claimed is:

1. An ethylene copolymer comprising 85.0 to 99.995 mol% of an ethylene unit, 0.005 to 5 mol% of a comonomer unit represented by the formula (I)

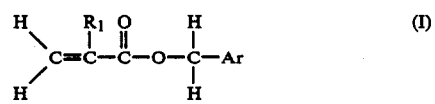

wherein Ar is

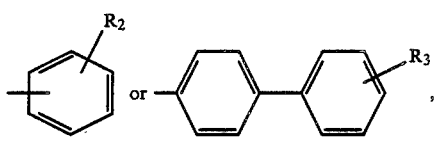

$R_1$ is a hydrogen atom or a methyl group, each of $R_2$ and $R_3$ is a hydrogen atom, or a straight-chain or a side-chain alkyl group having 1 to 4 carbon atoms, and 0 to 10 mol% of an ethylenic unsaturated monomer unit, said ethylene copolymer having a density of 0.860 to 0.970 g/cm$^3$ and a melt index of 0.05 to 100 g/10 minutes.

2. An ethylene copolymer according to claim 1 wherein said comonomer represented by said formula (I) is at least one comonomer selected from the group consisting of benzyl methacrylate, methylbenzyl methacrylate, benzyl acrylate, phenylbenzyl methacrylate and phenylbenzyl acrylate.

3. An ethylene copolymer according to claim 1 wherein said copolymer is a copolymer which has been obtained by a high-pressure radical polymerization at a pressure of 500 to 4,000 kg/cm$^2$ at a temperature of 50 to 400° C.

4. An ethylene copolymer according to claim 1 containing 0% of said ethylenic unsaturated monomer units.

5. An ethylene copolymer according to claim 4 in which $R_1$ is methyl.

* * * * *